(12) United States Patent
Chung et al.

(10) Patent No.: US 9,804,428 B2
(45) Date of Patent: Oct. 31, 2017

(54) COMPOSITE SHEET, SUBSTRATE FOR A DISPLAY ELEMENT INCLUDING SAME, AND DISPLAY DEVICE INCLUDING SAME

(71) Applicant: CHEIL INDUSTRIES INC., Gum-si, Gyeongsangbuk-do (KR)

(72) Inventors: Kyu Ha Chung, Uiwang-si (KR); Tae Ho Kim, Uiwang-si (KR); Sung Kook Kim, Uiwang-si (KR); Young Kwon Kim, Uiwang-si (KR); Sang Keol Lee, Uiwang-si (KR); Byeong Do Kwak, Uiwang-si (KR); Sung Han Im, Uiwang-si (KR); Eun Hwan Jeong, Uiwang-si (KR); Seok Won Choi, Uiwang-si (KR); Tae Jung Kim, Uiwang-si (KR); Woo Jin Lee, Uiwang-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 301 days.

(21) Appl. No.: 14/346,623

(22) PCT Filed: Sep. 19, 2012

(86) PCT No.: PCT/KR2012/007499
§ 371 (c)(1),
(2) Date: Mar. 21, 2014

(87) PCT Pub. No.: WO2013/042938
PCT Pub. Date: Mar. 28, 2013

(65) Prior Publication Data
US 2014/0234599 A1 Aug. 21, 2014

(30) Foreign Application Priority Data
Sep. 21, 2011 (KR) .......................... 10-2011-0095430

(51) Int. Cl.
*B32B 7/00* (2006.01)
*G02F 1/1333* (2006.01)
*G02F 1/1335* (2006.01)

(52) U.S. Cl.
CPC ...... *G02F 1/133305* (2013.01); *G02F 1/1335* (2013.01); *Y10T 428/24942* (2015.01)

(58) Field of Classification Search
None
See application file for complete search history.

(56) References Cited

U.S. PATENT DOCUMENTS

2008/0213474 A1* 9/2008 Saida ................ G02F 1/133305
427/162
2009/0015781 A1* 1/2009 Shimodaira ................ C08J 5/08
349/158
(Continued)

FOREIGN PATENT DOCUMENTS

CN 1558824 A 12/2004
CN 102016962 A 4/2011
(Continued)

OTHER PUBLICATIONS

Wikipedia: https://en.wikipedia.org/wiki/Stiffness. Copyright 2016.*
SIPO Office action dated Dec. 19, 2014, in corresponding application No. 201280051299.2, 15 pages.

*Primary Examiner* — David Sample
*Assistant Examiner* — Nicole T Gugliotta
(74) *Attorney, Agent, or Firm* — Lewis Roca Rothgerber Christie LLP

(57) ABSTRACT

The present invention relates to a composite sheet, to a substrate for a display element including same, and to a display device including same. More specifically, the composite sheet comprises: a reinforcement-impregnated matrix; a coating layer formed on at least one surface of the
(Continued)

matrix; and a barrier layer formed on at least one surface of the coating layer, wherein, if an elastic modulus of the matrix is E2 at a temperature of 25° C. and an elastic modulus of the coating layer is E3 at a temperature of 25° C., the ratio of the elastic modulus, i.e. E3/E2, is approximately $5 \times 10^4$ or less.

13 Claims, 2 Drawing Sheets

(56) References Cited

U.S. PATENT DOCUMENTS

| | | |
|---|---|---|
| 2009/0142567 A1 | 6/2009 | Kanakarajan et al. |
| 2012/0243115 A1* | 9/2012 | Takamiya .......... B29D 11/0073 359/894 |

FOREIGN PATENT DOCUMENTS

| | | | | |
|---|---|---|---|---|
| EP | 1 787 795 A1 | 5/2007 | | |
| JP | 2007-118323 A | 5/2007 | | |
| JP | 2009-012288 A | 1/2009 | | |
| JP | 2010-519381 A | * 6/2010 | ................ | C08J 5/04 |
| KR | 10-2006-0055100 A | 5/2006 | | |
| KR | 10-2009-0074998 A | 7/2009 | | |
| WO | WO 2011/040541 A1 | 4/2011 | | |
| WO | WO 2011/083879 | * 7/2011 | ........... | C09D 183/04 |
| WO | WO 2013/042938 A3 | 3/2013 | | |

* cited by examiner

[FIG 1]
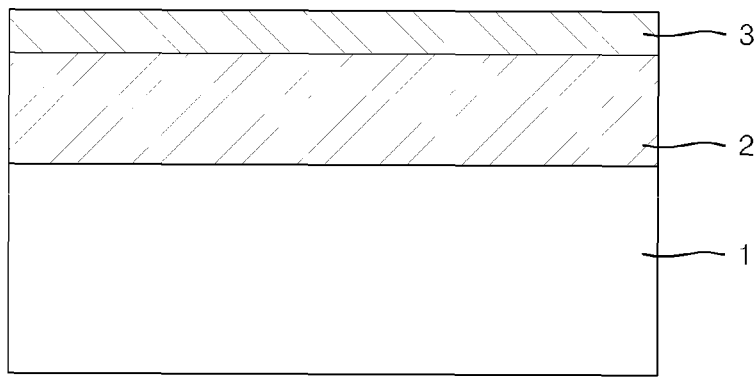
[FIG 2]
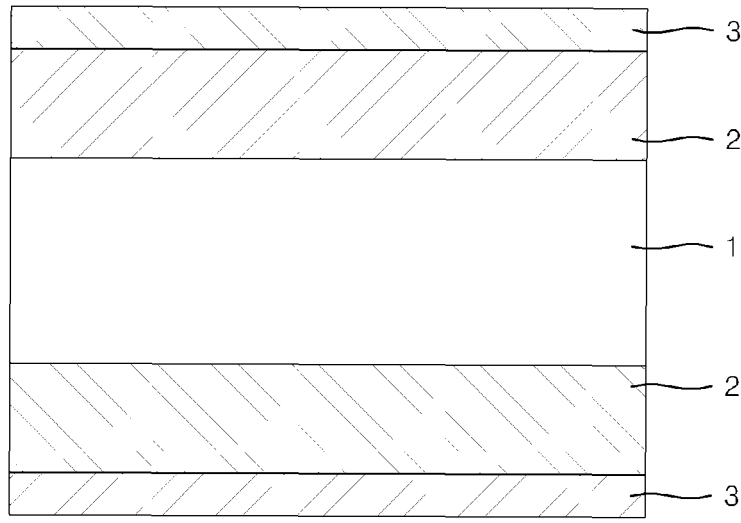

【FIG 3】
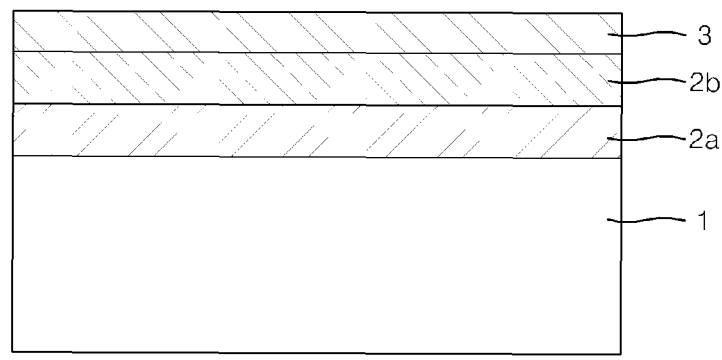
【FIG 4】
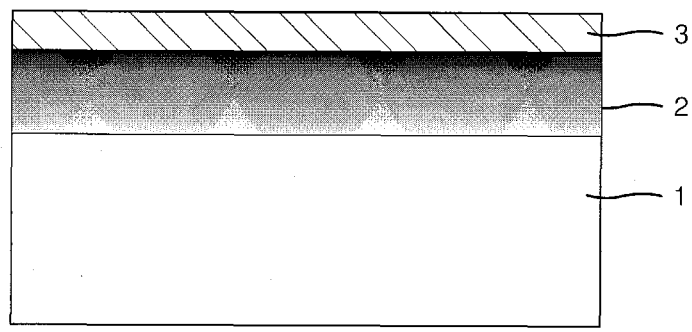

COMPOSITE SHEET, SUBSTRATE FOR A DISPLAY ELEMENT INCLUDING SAME, AND DISPLAY DEVICE INCLUDING SAME

CROSS-REFERENCE TO RELATED APPLICATION(S)

This application is a National Phase Patent Application and claims priority to and benefit of International Patent Application Number PCT/KR2012/007499, filed on Sep. 19, 2012, which claims priority to and benefit of Korean Patent Application Number 10-2011-0095430, filed on Sep. 21, 2011, the entire disclosures of which are incorporated herein by reference.

TECHNICAL FIELD

The present invention relates to a composite sheet, a substrate for display elements including the same, and a display including the same. More particularly, the present invention relates to a composite sheet including a coating layer having a ratio of elastic modulus thereof to that of a matrix within a specific range, a substrate for display elements including the same and a display including the same. According to the invention, since the composite sheet buffers a difference in elastic modulus between layers thereof due to addition of the coating layer, the composite sheet can have improved properties in terms of flexural resistance, flexibility and durability, and be reduced in moisture permeability and flatness.

BACKGROUND ART

Glass substrates having excellent heat resistance and transparency, and a low coefficient of linear expansion are used as substrates for liquid crystal display elements, organic EL display elements, color filters, solar cells, and the like. Recently, plastic materials have attracted attention as an alternative to glass substrates for display devices to satisfy requirements, such as reduction in size, thickness and weight, excellent impact resistance, and flexibility.

Examples of materials recently used as such plastic substrates include polyesters such as PET (polyethylene terephthalate) or PEN (polyethylene naphthalate) and the like, polycarbonate, polyethersulfone, cyclo olefin resins, epoxy resins, acrylic resins, and the like. However, these materials can cause problems, such as product warpage, wire disconnection and the like, due to their considerably high coefficients of thermal expansion. In addition, a resin such as a polyamide resin exhibiting a low coefficient of thermal expansion can be used as the substrate. However, the polyamide resin is not suitable for the substrate material due to very low transparency, high birefringence, moisture absorption, and the like.

To solve such problems, a composite sheet having a very low thermal expansion and exhibiting good flexibility, heat resistance and transparency is prepared using glass fiber cloths and a low-anisotropy silicone rubber compound as a matrix. However, to use such a composite sheet as a substrate for displays, a barrier layer for preventing moisture permeability and gas permeation from outside should be introduced. However, such a barrier layer exhibits high elastic modulus, different mechanical properties from the matrix, and weak interfacial adhesion between two layers, thereby causing problems in terms of flexural resistance, flexibility and durability, such as cracking, and the like.

DISCLOSURE

Technical Problem

It is one aspect of the present invention to provide a composite sheet having improved flexural resistance, flexibility and durability.

It is another aspect of the present invention to provide a composite sheet having reduced moisture permeability and flatness.

It is a further aspect of the present invention to provide a composite sheet that can be used as a substrate for displays.

It is yet another aspect of the present invention to provide a substrate for display elements including the composite sheet.

Technical Solution

In accordance with one aspect of the present invention, a composite sheet includes: a matrix; a reinforcement material impregnated into the matrix; a coating layer formed on at least one surface of the matrix; and a barrier layer formed on at least one surface of the coating layer, wherein, when the matrix has an elastic modulus at 25° C. of E2 and the coating layer has an elastic modulus at 25° C. of E3, a ratio of the elastic modulus E3/E2 is about $5 \times 10^4$ or less.

The ratio of the elastic modulus E3/E2 may range from about 10 to about $5 \times 10^4$.

The coating layer may include at least two layers having different elastic modulus at 25° C.

The coating layer may have a gradient elastic modulus structure.

When the matrix has a thickness of T2 and the coating layer has a thickness of T3, a ratio of the thickness T3/T2 may range from about $1 \times 10^{-3}$ to about $5 \times 10^{-1}$.

In accordance with another aspect of the present invention, a substrate for display elements may include the composite sheet.

In accordance with a further aspect of the present invention, a display may include the composite sheet or the substrate for display elements.

Advantageous Effects

The present invention provides a composite sheet exhibiting low flatness and moisture permeability, and high flexural resistance, flexibility and durability. The present invention also provides a substrate for display elements including the composite sheet.

DESCRIPTION OF DRAWINGS

FIG. 1 is a cross-sectional view of a composite sheet according to one embodiment of the present invention.

FIG. 2 is a cross-sectional view of a composite sheet according to another embodiment of the present invention.

FIG. 3 is a cross-sectional view of a composite sheet according to a further embodiment of the present invention.

FIG. 4 is a cross-sectional view of a composite sheet according to yet another embodiment of the present invention.

BEST MODE

In accordance with one aspect of the present invention, a composite sheet may include: a matrix; a reinforcement material impregnated into the matrix; a coating layer formed on at least one surface of the matrix; and a barrier layer formed on at least one surface of the coating layer.

Since the coating layer buffers a difference in elastic modulus between layers of the composite sheet, the composite sheet can have improved properties in terms of flexural resistance, flexibility and durability, and be reduced in moisture permeability and flatness.

The composite sheet may have a ratio of elastic modulus at 25° C. of the matrix and the coating layer within a specific range. Specifically, when the matrix has an elastic modulus at 25° C. of E2 and the coating layer has an elastic modulus at 25° C. of E3, a ratio of the elastic modulus E3/E2 may be about $5 \times 10^4$ or less. If the ratio of the elastic modulus E3/E2 is greater than $5 \times 10^4$, the composite sheet cannot realize excellent properties in term of flexural resistance, flexibility, and durability.

Preferably, the ratio of the elastic modulus E3/E2 ranges from about 10 to about $5 \times 10^4$, more preferably from about $5 \times 10^2$ to about $2 \times 10^4$.

In the composite sheet, the coating layer may be formed on one or both surfaces of the matrix, and the barrier layer may be formed on one or both surfaces of the coating layer.

FIGS. 1 and 2 are cross-sectional views of composite sheets according to embodiments of the present invention.

Referring to FIG. 1, a composite sheet may have a structure, in which a coating layer (2) is formed on one surface of a reinforcement material-impregnated matrix (1), and a barrier layer (3) is formed on one surface (a surface not contacting the matrix) of the coating layer (2).

Referring to FIG. 2, a composite sheet may have a structure, in which a coating layer (2) is formed on both surfaces of a reinforcement material-impregnated matrix (1), and a barrier layer (3) is formed on one surface (a surface not contacting the matrix) of the coating layer (2).

In the composite sheet, the coating layer may include at least two layers having different elastic modulus at 25° C. Here, among the layers included in the coating layer, since the layer contacting the matrix has similar elastic modulus to the matrix and the layer contacting the barrier layer has similar elastic modulus to the barrier layer, the coating layer can provide a buffering effect.

FIG. 3 is a cross-sectional view of a composite sheet according to a further embodiment of the present invention.

Referring to FIG. 3, a composite sheet may include: a reinforcement material-impregnated matrix (1); a coating layer (2a and 2b) formed on one surface of the matrix (1); and a barrier layer (3) formed on one surface (a surface not contacting the matrix) of the coating layer, wherein the coating layer may include two layers 2a and 2b having different elastic modulus. Although the coating layer is illustrated as a stacked body including two layers having different elastic modulus in FIG. 3, the coating layer according to the invention may include a stacked body of two or more layers having different elastic modulus.

In the composite sheet according to the invention, the coating layer may have a gradient elastic modulus structure. As used herein, the 'gradient elastic modulus structure' may mean a structure in which the elastic modulus has a gradual gradient or change instead of being rapidly changed in one layer.

FIG. 4 is a cross-sectional view of a composite sheet according to yet another embodiment of the present invention.

Referring to FIG. 4, a composite sheet may include: a reinforcement material-impregnated matrix (1); a coating layer (2) formed on one surface of the matrix (1); and a barrier layer (3) formed on one surface (a surface not contacting the matrix) of the coating layer, wherein the coating layer (2) may be formed as a single layer and have a gradient elastic modulus structure. For example, a portion of the coating layer contacting the matrix has a similar elastic modulus to that of the matrix, and a portion of the coating layer contacting the barrier layer has a similar elastic modulus to that of the barrier layer, in which the elastic modulus of the coating layer forms a gradual gradient from the portion contacting the matrix to the portion contacting the barrier layer.

In particular, the coating layer of FIG. 4 may be prepared by plasma treatment of a coating layer material which is an organic/inorganic hybrid solution prepared by sol-gel hydrolysis, without being limited thereto.

The organic/inorganic hybrid solution may be prepared by any method without limitation so long as sol-gel hydrolysis is used in the method. Then, a hydrocarbon-removed inorganic layer is secured through plasma treatment of the organic/inorganic hybrid solution, followed by forming the gradient elastic modulus structure, without being limited thereto.

When the organic/inorganic hybrid solution is prepared by sol-gel hydrolysis, a raw material for sol-gel hydrolysis may include alkoxysilane or aryloxysilane represented by Formula 1, silanealkoxide or silanearyloxide represented by Formula 2, or mixtures thereof.

$$R^1_x Si(OR^2)_{(4-x)} \qquad \text{<Formula 1>}$$

(where $R^1$ is a $C_1$ to $C_{20}$ alkyl group, a $C_6$ to $C_{20}$ aryl group, a vinyl group, and a $C_1$ to $C_{20}$ alkyl group having an acrylic group, methacrylic group or epoxy group; $R^2$ is a $C_1$ to $C_{20}$ alkyl group, or a $C_6$ to $C_{20}$ aryl group; and x is an integer from 1 to 3)

$$Si(OR^3)_4 \qquad \text{<Formula 2>}$$

(where $R^3$ is a $C_1$ to $C_{20}$ alkyl group, or a $C_6$ to $C_{20}$ aryl group).

When $R^1$ and $R^2$ are an alkyl group, at least one hydrogen atom may be substituted with a fluorine atom.

When $R^3$ is an alkyl group, at least one hydrogen atom may be substituted with a fluorine atom.

In addition, a compound in which another metal such as Ti, Zr and the like replaces Si in the alkoxysilane or aryloxysilane represented by Formula 1 and in the silanealkoxide or silanearyloxide represented by Formula 2 may be used.

Preferably, the raw material for sol-gel hydrolysis comprises trialkoxysilane corresponding to the case that x is 1 in Formula 1, or dialkoxysilane corresponding to the case that x is 2 in Formula 1. Examples of the trialkoxysilane may include methyltrimethoxysilane, methyltriethoxysilane, ethyltrimethoxysilane, ethyltriethoxysilane, 3-glycidoxypropyltrimethoxysilane, 3-acryloxypropyltrimethoxysilane, 3-acryloxypropyltriethoxysilane, 3-methacryloxypropyltrimethoxysilane, 3-methacryloxypropyltriethoxysilane, vinyltriethoxysilane, and vinyltrimethoxysilane, without being limited thereto. Examples of the dialkoxysilane may include dimethyldimethoxysilane, dimethyldiethoxysilane, diethyldimethoxysilane, and diethyldiethoxysilane, without being limited thereto. The silanealkoxide of Formula 2 may include at least one of tetraethylorthosilicate, tetramethylorthosilicate, tetraisopropylorthosilicate, and tetrabutylorthosilicate.

The matrix may have an elastic modulus at 25° C. of about 100 MPa or less, that is, about 0.1 GPa or less. Within this range, the composite sheet can be reduced in flatness and moisture permeability while exhibiting excellent flexibility, flexural resistance and durability. Preferably, the matrix has an elastic modulus at 25° C. from about 0.01 MPa to about 10 MPa, more preferably from about 0.1 MPa to about 1 MPa.

The coating layer may have an elastic modulus at 25° C. of about 10 GPa or less. Within this range, the composite sheet can be reduced in flatness and moisture permeability while exhibiting excellent flexibility, flexural resistance and durability. Preferably, the coating layer has an elastic modulus at 25° C. from about 0.1 GPa to about 10 GPa, more preferably from about 0.1 GPa to about 6 GPa, still more preferably from about 0.1 GPa to about 5 GPa.

The barrier layer may have an elastic modulus at 25° C. of about 10 GPa or more. Within this range, the composite sheet can be reduced in flatness and moisture permeability while exhibiting excellent flexibility, flexural resistance and durability. Preferably, the barrier layer has an elastic modulus at 25° C. from about 10 GPa to about 350 GPa, more preferably from about 100 GPa to about 200 GPa.

When the matrix has a thickness of T2 and the coating layer has a thickness of T3, a ratio of the thicknesses T3/T2 may range from about $1 \times 10^{-3}$ to about $5 \times 10^{-1}$. Within this range, the composite sheet can exhibit excellent surface flatness and can be efficiently controlled in terms of water vapor transmission rate without affecting transmittance. T3 may mean a thickness of the overall coating layer included in the composite sheet, or a thickness of only the coating layer formed on one surface of the matrix.

In the composite sheet, the matrix, the coating layer and the barrier layer may respectively have a thickness from about 50 μm to about 200 μm, from about 0.2 μm to about 100 μm, and from about 5 nm to about 200 nm.

The matrix may include at least one selected from the group consisting of silicone resins, styrene-butadiene rubber (SBR), butadiene rubber, isoprene rubber, chloroprene rubber, neoprene rubber, ethylene-propylene-diene terpolymers, styrene-ethylene-butylene-styrene (SEBS) block copolymers, styrene-ethylene-propylene-styrene (SEPS) block copolymers, acrylonitrile-butadiene rubber (NBR), hydrogenated nitrile rubber (NBR), fluorinated rubber, and plasticized polyvinyl chloride. Preferably, the matrix is silicone rubber.

The silicone resin may be an organopolysiloxane having an average degree of polymerization from about 5 to about 2000. Examples of the organopolysiloxane may include polydimethylsiloxane, polymethylphenylsiloxane, polyalkylarylsiloxane, polyalkylalkylsiloxane, and the like. These compounds are composed of molecules having a three-dimensional network structure. The organopolysiloxane may have about 5 to about 500 network bonding points, and have a structure in which one network point is included in each $R^2SiO$ (where $R^2$ is a $C_1$ to $C_{10}$ alkyl group, a $C_6$ to $C_{20}$ aryl group, or hydrogen).

The silicone resin may be an organopolysiloxane having a viscosity from about 5 cSt to about 500,000 cSt. Within this range, the composite sheet can exhibit excellent properties in terms of flexibility, heat resistance, moisture permeability, durability and flatness. Preferably, the silicone resin has a viscosity from about 5 Cst to about 120,000 cSt, more preferably from about 100 cSt to about 100,000 cSt, still more preferably from about 1,000 cSt to about 80,000 cSt.

The reinforcement material is impregnated into the matrix. As used herein, the 'reinforcement material-impregnated matrix' may include both a structure in which the reinforcement material is dispersed or included in the matrix and a structure in which the reinforcement material is formed in a layer structure inside the matrix. The reinforcement material may include at least one of glass fibers, glass fiber cloths, glass fabrics, nonwoven glass fabrics, glass meshes, glass beads, glass flakes, silica particles, and colloidal silica.

The composite sheet may be prepared through impregnation of the reinforcement material into a matrix resin, followed by crosslinking (curing).

The coating layer may include at least one of acrylic resin, epoxy resin, silicone resin, urethane resin, and unsaturated polyester resins, as a curable resin. Preferably, the coating layer includes an acrylic resin.

In the composite sheet, the coating layer may be prepared by coating the curable resin and the like onto the reinforcement material-impregnated matrix, followed by curing.

The barrier layer may exhibit gas barrier properties, moisture permeation resistance, mechanical properties, smoothness, and properties of maximizing adhesion between the matrix and the coating layer. The barrier layer may include at least one of silicon nitride, silicon oxide, silicon carbide, aluminum nitride, ITO, and IZO. The barrier layer may be formed as a single layer including at least two materials for formation of the barrier layer, or as multiple layers in which a plurality of different barrier layers is stacked.

In the composite sheet, the barrier layer may be formed on the surface of the coating layer by physical deposition, chemical deposition, coating, sputtering, evaporation, ion implantation, wet coating, organic/inorganic multilayer coating, or the like.

Since the composite sheet has improved properties in terms of flexural resistance, flexibility and durability while reducing flatness and moisture permeability, the composite sheet may be used in displays and optical devices, such as substrates for liquid crystal display elements, color filters, organic EL display elements, solar cells, touch screen panels, flexible displays, and the like.

In accordance with another aspect of the present invention, a substrate for display elements may include the composite sheet. The substrate for display elements may be prepared by a typical method known in the art. The substrate for display elements may include a substrate for flexible displays, without being limited thereto.

In accordance with a further aspect of the present invention, a device may include the composite sheet or the substrate for display elements. The device may include flexible displays, liquid crystal displays, organic EL devices, color filters, and solar cells, without being limited thereto.

MODE FOR INVENTION

Hereinafter, the present invention will be described in more detail with reference to some examples. It should be understood that these examples are provided for illustration only and are not to be construed in any way as limiting the present invention.

Descriptions of details apparent to those skilled in the art will be omitted for clarity.

Details of components used in Examples and Comparative Example are as follows:

1. Matrix: Two matrices having an elastic modulus of 0.1 MPa and of 1 MPa, respectively, while capable of being used in preparation of a transparent composite sheet by blending silicone resins (Sylgard 184, MH series, and XD series, Dow Corning Co., Ltd.)

2. Reinforcement material: Glass fiber cloth (3313, Nittobo Co., Ltd.)

3. Coating layer: Curable acrylic resin (OER, Minuta Technology Co., Ltd.)
4. Barrier layer: Silicon oxide, Silicon nitride Example 1

With a reinforcement material placed on a glass substrate, a matrix resin was coated onto the reinforcement material. A glass substrate was placed on the matrix resin, followed by impregnating the reinforcement material into the matrix resin through lamination. Thermal curing was performed, followed by removing the glass substrates, thereby preparing a 90 μm thick sheet in which the reinforcement material was impregnated into the matrix.

The surface of the sheet was subjected to plasma treatment. Next, a curable acrylic resin having an elastic modulus of 0.5 GPa was coated to a thickness of 5 μm onto both surfaces of the sheet, followed by UV curing, thereby preparing a 100 μm sheet. A barrier layer was formed by alternately sputtering silicon oxide and silicon nitride, thereby preparing a composite sheet.

Example 2

A composite sheet was prepared in the same manner as in Example 1 except that a curable acrylic resin having an elastic modulus of 2 GPa was used instead of the curable acrylic resin having an elastic modulus of 0.5 GPa.

Example 3

A composite sheet was prepared in the same manner as in Example 1 except that a curable acrylic resin having an elastic modulus of 6 GPa was used instead of the curable acrylic resin having an elastic modulus of 0.5 GPa.

Example 4

The reinforcement material was impregnated into a matrix resin having an elastic modulus of a matrix of 0.1 MPa in the same manner as in Example 1. Thermal curing was performed, followed by removing the glass substrates, thereby preparing a 90 μm thick sheet in which the reinforcement material was impregnated into the matrix. Next, a composite sheet was prepared in the same manner as in Example 1 except that a curable acrylic resin having an elastic modulus of 2 GPa was used instead of the curable acrylic resin having an elastic modulus of 0.5 GPa.

Comparative Example 1

The reinforcement material was impregnated into a matrix resin having an elastic modulus of a matrix of 0.1 MPa in the same manner as in Example 1. Thermal curing was performed, followed by removing the glass substrates, thereby preparing a 90 μm thick sheet in which the reinforcement material was impregnated into the matrix. Next, a composite sheet was prepared in the same manner as in Example 1 except that a curable acrylic resin having an elastic modulus of 6 GPa was used instead of the curable acrylic resin having an elastic modulus of 0.5 GPa.

Experimental Example

Each of the composite sheets prepared in Examples and Comparative Example was evaluated as to elastic modulus, moisture permeability, transmittance, coefficient of thermal expansion, flatness, and flexural resistance. Results are shown in Table 1.

(1) Elastic modulus: Elastic modulus was measured at 25° C. using a MTS Alliance RT/5 test frame provided with a 100 N load cell. A specimen was secured to two air grippers separated a distance of 25 mm from each other and drawn at a crosshead speed of 1 mm/min. Load and displacement data was continuously collected, and a maximum slope of an initial portion of a load-displacement curve was chosen as Young's modulus. The composite sheet was pressed by a load of 50 mN for 5 seconds using a Nano Indenter (Hysitron Co., Ltd.), followed by removing the load to restore the composite sheet, thereby choosing a slope of a displacement curve as Young's modulus.

(2) Moisture permeability: Moisture permeability was measured using a MOCON apparatus in accordance with ASTM F 1249. The prepared specimen was cut to a size of 30 mm×40 mm and secured to a jig having a through-hole at the center thereof, followed by measurement of moisture permeability at 25° C. and 100% RH.

(3) Transmittance: Transmittance was measured at a wavelength of 550 nm using a UV/VIS spectrometer (Lambda 45, PerkinElmer CO., Ltd.).

(4) Coefficient of thermal expansion: Coefficient of thermal expansion was measured using a TMA (Q40, Texas Instrument Inc.) in accordance with ASTM E 831.

(5) Flatness: Flatness (Ra) was measured using an optical surface profiler (700s, ZYGO Co., Ltd.).

(6) Flexural resistance: Flexural resistance was measured by a mandrel bend test under the conditions of a rod diameter of 7 mm in accordance with ASTM D522-93a. The specimen suffering from cracking was rated as Fail, and the specimen not suffering from cracking was rated as Pass.

TABLE 1

| | Elastic modulus of coating layer (E3) (GPa) | Elastic modulus of matrix (E2) (MPa) | Ratio of elastic modulus (E3/E2) | Elastic modulus of barrier layer (GPa) | Moisture Permeability (g/m$^2$/day) | Transmittance (%) | Coefficient of thermal expansion (ppm/° C.) | Flatness (nm) | Flexural resistance |
|---|---|---|---|---|---|---|---|---|---|
| Example 1 | 0.5 | 1 | 5 × 10$^2$ | 150 | 0.2 | Greater than 90 | 3-5 | 40 | Pass |
| Example 2 | 2 | 1 | 2 × 10$^3$ | 150 | 0.1 | Greater than 90 | 3-5 | 35 | Pass |
| Example 3 | 6 | 1 | 6 × 10$^3$ | 150 | 0.3 | Greater than 90 | 3-5 | 45 | Pass |
| Example 4 | 2 | 0.1 | 2 × 10$^4$ | 150 | 0.6 | Greater than 90 | 3-5 | 37 | Pass |

TABLE 1-continued

| | Elastic modulus of coating layer (E3) (GPa) | Elastic modulus of matrix (E2) (MPa) | Ratio of elastic modulus (E3/E2) | Elastic modulus of barrier layer (GPa) | Moisture Permeability (g/m²/day) | Transmittance (%) | Coefficient of thermal expansion (ppm/° C.) | Flatness (nm) | Flexural resistance |
|---|---|---|---|---|---|---|---|---|---|
| Comparative Example 1 | 6 | 0.1 | 6 × 10⁴ | 150 | 7 | Greater than 90 | 3-5 | 50 | Fail |

As shown in Table 1, the composite sheets according to the invention, which included the coating layer having a ratio of elastic modulus thereof to that of the matrix within a specific range, exhibited superior flexural resistance to the composite sheet including the coating layer having an elastic modulus ratio not in the specific range. In addition, the composite sheets according to the invention also exhibited lower flatness and moisture permeability than the composite sheet of Comparative Example 1.

Although the present invention has been described with reference to some embodiments in conjunction with the accompanying drawings, it should be understood that the present invention is not limited to the foregoing embodiments and may be embodied in different ways, and that various modifications, changes, alterations, and equivalent embodiments can be made by those skilled in the art without departing from the spirit and scope of the present invention. Therefore, the scope of the invention should be limited only by the accompanying claims and equivalents thereof.

The invention claimed is:

1. A composite sheet comprising:
a matrix comprising at least one of a silicone resin, a styrene-butadiene rubber (SBR), a butadiene rubber, an isoprene rubber, a chloroprene rubber, a neoprene rubber, an ethylene-propylene-diene terpolymer, a styrene-ethylene-butylene-styrene (SEBS) block copolymer, a styrene-ethylene-propylene-styrene (SEPS) block copolymer, an acrylonitrile-butadiene rubber (NBR), a hydrogenated nitrile rubber (NBR), a fluorinated rubber, or a plasticized polyvinyl chloride;
a reinforcement material impregnated into the matrix;
a coating layer formed on at least one surface of the matrix; and
a barrier layer formed on at least one surface of the coating layer, wherein the coating layer is formed between the matrix and the barrier layer,
wherein, when the matrix has an elastic modulus at 25° C. of E2 and the coating layer has an elastic modulus at 25° C. of E3, a ratio of the elastic modulus E3/E2 is about $5 \times 10^4$ or less,
wherein the coating layer comprises at least one of acrylic resins, epoxy resins, urethane resins, and unsaturated polyester resins.

2. The composite sheet according to claim 1, wherein the ratio of the elastic modulus E3/E2 ranges from about 10 to about 5×10⁴.

3. The composite sheet according to claim 1, wherein the coating layer comprises at least two layers having different elastic moduli at 25° C.

4. The composite sheet according to claim 1, wherein the coating layer has a gradient elastic modulus structure.

5. The composite sheet according to claim 4, wherein the coating layer is prepared through plasma treatment of a coating layer material which is an organic/inorganic hybrid solution prepared by sol/gel hydrolysis.

6. The composite sheet according to claim 1, wherein the matrix has an elastic modulus at 25° C. of about 0.1 GPa or less.

7. The composite sheet according to claim 1, wherein the coating layer has an elastic modulus at 25° C. from about 0.1 GPa to about 10 GPa.

8. The composite sheet according to claim 1, wherein the barrier layer has an elastic modulus at 25° C. of about 10 GPa or more.

9. The composite sheet according to claim 1, wherein when the matrix has a thickness of T2 and the coating layer has a thickness of T3, a ratio of the thicknesses T3/T2 ranges from about $1 \times 10^{-3}$ to about $5 \times 10^{-1}$.

10. The composite sheet according to claim 1, wherein the reinforcement material comprises at least one of glass fibers, glass fiber cloths, glass fabrics, nonwoven glass fabrics, glass meshes, glass beads, glass flakes, silica particles, and colloidal silica.

11. The composite sheet according to claim 1, wherein the barrier layer comprises at least one of silicon nitride, silicon oxide, silicon carbide, aluminum nitride, aluminum oxide, ITO, and IZO.

12. A substrate for display elements comprising the composite sheet according to claim 1.

13. A display comprising the substrate for display elements according to claim 12.

* * * * *